United States Patent [19]

Van Russelt et al.

[11] 3,897,385

[45] July 29, 1975

[54] PROCESS FOR THE PREPARATION OF COMPOSITE MATERIALS HAVING HIGH IMPACT STRENGTH AND STRONG RIGIDITY AND MATERIALS SO-OBTAINED

[75] Inventors: Michel Van Russelt, Brussels; Claude Bleiman; Jean Mercier, both of Kessel-Lo, all of Belgium

[73] Assignee: Gerdec, Paris, France

[22] Filed: July 11, 1973

[21] Appl. No.: 378,212

[30] Foreign Application Priority Data
July 11, 1972 France ............................ 72.25032

[52] U.S. Cl. ........ 260/42.14; 117/100 S; 260/42.16; 260/42.53; 260/42.54
[51] Int. Cl. ............................................. C08f 45/04
[58] Field of Search............ 260/41 A, 42.54, 42.16, 260/42.53, 42.14; 117/100 S

[56] References Cited
UNITED STATES PATENTS

| | | | |
|---|---|---|---|
| 3,318,826 | 5/1967 | Bridgeford | 260/41 |
| 3,383,435 | 5/1968 | Cizek | 260/901 |
| 3,519,593 | 7/1970 | Bolger | 260/41 |
| 3,519,594 | 7/1970 | Michaels | 260/41 |
| 3,692,816 | 9/1972 | Faille | 260/46.5 R |

FOREIGN PATENTS OR APPLICATIONS

| | | | |
|---|---|---|---|
| 1,095,700 | 12/1967 | United Kingdom | 260/41 |

*Primary Examiner*—James H. Derrington
*Attorney, Agent, or Firm*—Millen, Raptes & White

[57] ABSTRACT

Reinforced normally solid vinyl aromatic polymers having improved impact strength, tensile strength, flexural modulus and tractional modulus are provided by using a strengthening filler comprising a phyllosilicate and a copolymer of a vinyl aromatic monomer and an ethylenically unsaturated polar comonomer.

39 Claims, No Drawings

PROCESS FOR THE PREPARATION OF COMPOSITE MATERIALS HAVING HIGH IMPACT STRENGTH AND STRONG RIGIDITY AND MATERIALS SO-OBTAINED

BACKGROUND OF THE INVENTION

The present invention relates to composite reinforced polymers which exhibit a high impact strength and strong rigidity. More particularly, this invention relates to reinforced polystyrenes.

It is known that phyllosilicates, where incorporated in materials such as thermoplastics, elastomers or the like improve or change the properties of these materials and impart better mechanical strength thereto. For this purpose, several processes have been proposed. Generally, the fillers are added to matrices which have already been polymerized, but in such cases, the filler can be incorporated in only relatively small amounts, e.g., less than 10% by weight. For example, reinforced polymers are commonly obtained by liquifying the polymeric matrix either by heating or by dissolving same in a solvent, then by incorporating the siliceous filler into the plastic or liquid polymer by mixing or grinding equipment. Such a process has the disadvantage of generally resulting in a poor dispersion of the filler in the polymeric matrix, as well as the danger of polymer degradation.

It is known that polystyrene is very brittle, and accordingly numerous attempts have been made to improve its resilience, which have successfully led to "impact" polystyrene having an impact strength about six to ten times as high as conventional styrene polymers. These impact polystyrenes are generally obtained by incorporating into a styrene matrix generally no more than 10% by weight (based on the weight of the matrix) of a rubbery polymer, e.g., polybutadiene, butadieneacrylonitrile rubber, etc., either by physical mixing or by forming a grafted copolymer. Mixing of the vitreous styrene polymer matrix with a rubber has many disadvantages. In particular, it generally causes a large decrease in both the rigidity and tensile strength of the resultant material, which typically fall to 60 and 50% respectively of the corresponding values for unreinforced polystyrene.

Phyllosilicates are well known and widely used as strengthening fillers for polymeric materials, e.g., as shown in U.S. Pat. No. 3,692,816, and the references cited therein, the contents of which are incorporated by reference herein. According to the teachings of this patent, phyllosilicates pretreated with a silane can be copolymerized with an alkyl acrylate or methacrylate or styrene to form graft copolymers.

Copending, commonly assigned U.S. Patent Application Ser. No. 351,583, filed Apr. 16, 1973, describes the preparation of low molecular weight polystyrene (usually 1,000–10,000) by bulk polymerization in the presence of an acid-hydrolyzed phyllosilicate, differing from the process of the aforementioned U.S. Patent, inter alia, in not pretreating the phyllosilicate with an organosilane. The resultant low molecular weight products are not tough but rather are malleable and useful as plasticizers.

OBJECTS OF THE INVENTION

Accordingly, it is an object of the present invention to provide a process for preparing reinforced polymers having good impact strength and rigidity.

Another object of this invention is to provide reinforced polymer compositions useful as such or as strengthening fillers.

A further object of the present invention is to provide an improved impact polystyrene.

An additional object of the present invention is to provide novel copolymers of a phyllosilicate, styrene, and an a-ole-finically unsaturated polar comonomer.

Other objects and advantages of this invention will become apparent to those skilled in the art upon further study of the specification and appended claims.

SUMMARY OF THE INVENTION

Briefly, the above and other objects are attained in one aspect of the present invention by providing, in a normally solid vinyl aromatic polymer reinforced by a strengthening filler, the improvement wherein the strengthening filler comprises: a. 2–30 parts by weight per 100 parts by weight of vinyl aromatic polymer of a copolymer having a molecular weight $\overline{M}_r$ of at least 50,000 and consisting essentially of 100 molar parts of a vinyl aromatic monomer and 1 – 20 molar parts of an ethylenically unsaturated polar comonomer of the formula:

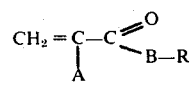

wherein A is hydrogen or alkyl of 1 – 6 carbon atoms, B is oxygen or —NH— and R is an organic hydrocarbon chain of 1 – 12 carbon atoms bearing a hydroxy or an epoxy group; and b. 5 – 40 weight %, based on the total polymer content in the reinforced composition, of a particulate phyllosilicate.

DETAILED DISCUSSION

The present invention makes it now possible to obtain modified styrene polymers which have an impact strength at least equal to the impact strength of the impact styrene polymers which are now commercialized. Moreover, the products of the present invention exhibit markedly improved mechanical properties and, in many cases, it is possible to obtain a polymer having more than twice the tensile strength and the rigidity modulus of the conventional prior art impact styrene polymers.

According to the process of this invention, a polymeric material exhibiting a high impact strength and strong rigidity is obtained by using as starting products at least a phyllosilicate, a vinyl aromatic monomer and polar ethylenically unsaturated, copolymerizable organic comonomer having an alcohol or epoxy function and an ester or amide function. The polymeric material product can be obtained by polymerization of the vinyl aromatic monomer either before, during or after incorporation of a phyllosilicate which has been previously reacted with either the comonomer alone or with a copolymer obtained from the monomer and the comonomer, or alternatively by copolymerization of the monomer and the comonomer carried out before, during or after incorporation of the phyllosilicate.

Thus, the polymeric material of this invention can be a suitable phyllosilicate first reacted with the polar comonomer, either as such or as a copolymer with the vinyl aromatic monomer, to which the vinyl aromatic monomer or a polymer thereof is then added, either by block or graft polymerization or by mechanical blending. Likewise, the normally solid vinyl aromatic polymer can serve as a prepolymer onto which the phyllosilicate is indirectly grafted via the polar monomer, either as such or as a copolymer with the vinyl aromatic monomer; correspondingly, the three components phyllosilicate, vinyl aromatic monomer and polar comonomer can all be present as a polymerization mixture.

The polar comonomer can also be incorporated into the polymeric material of this invention in any suitable manner, the only critical feature being that the polar comonomer, either as such or as a copolymer component, be allowed to react or absorb directly onto the phyllosilicate.

Suitable vinyl aromatic monomers useful in the present invention are well known in the art and include but are not limited to styrene, ring-substituted halo, nitro, thiol, alkyl, alkoxy, etc. styrenes, e.g., chloro and/or bromo styrenes, vinyl toluene, and the like; styrene substituted on the α- carbon atom of the vinyl group, e.g., α-alkyl styrenes such as α-methyl styrene; divinylbenzene; vinyl biphenyls, vinyl naphthalenes, vinylfurans, vinyl dibenzofurans, vinylpyridines, vinyl quinolines, and similar heterocyclic compounds. Of these, the styrene based monomers are preferred, especially styrene itself.

Suitable polar, ethylenically unsaturated comonomers which polymerize with styrene are well known in the art and include but are not limited to compounds represented by the general formula:

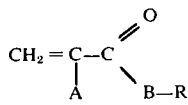

where A is hydrogen or an alkyl group comprising from 1 to 6 carbon atoms, particularly methyl; B is oxygen or a —NH—group, and R is an organic hydrocarbon chain having 1-12 preferably 2 - 4 carbon atoms and containing a hydroxy group or an epoxy group

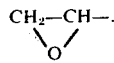

Preferred comonomers are the alkyl acrylates or alkyl alkylacrylates in which the alkyl radical has a hydroxy or epoxy group, especially the hydroxyethyl or hydroxypropyl acrylates or methacrylates and glycidyl acrylate or methacrylate.

Comonomers are advantageously associated with the styrene monomer in proportions of from 1 – 20 moles of comonomer per 100 moles of styrene monomer which corresponds to proportions of from 1–20 parts by weight of comonomer per 99 to 80 parts by weight of styrene monomer. Preferably the proportion of comonomer is comprised within the range from 3 to 10 moles per 100 moles of styrene monomer. The phyllosilicate is preferably used in a proportion of 5 to 40 parts per 100 parts by weight of the total resin constituted by the copolymer of styrene and the comonomer. As known, a phyllosilicate is characterized by tetrahedral layers containing silicon in the form of silica and by octahedral layers containing metals other than silicon, e.g., magnesium, aluminum, iron, etc. The particulate phyllosilicate can be micas, e.g., vermiculite, asbestos, etc. and either lamellar or fibrous. Preferred is asbestos, especially chrysotile asbestos.

Preferably the phyllosilicate used according to the present invention is a hydrolyzed phyllosilicate obtained by preliminary treatment with an acid in order to eliminate 5 to 30% by weight of the metallic atoms from the octahedral layer. The preliminary acid treatment is achieved in a conventional manner, preferably with an inorganic acid such as hydrochloric acid or an organic acid, these acids being preferably added with a saturated alcohol or a saturated ketone. A similar reaction is described in U.S. Pat. No. 3,692,816, the present treatment being made without adding an organosilane. This treatment partially eliminates the metallic atoms (magnesium more particularly) of the octahedral or cationic layer of the phyllosilicate without destruction of the tetrahedral silicic layer. Due to this treatment, the eliminated metallic fraction is replaced by silanol groups. Having an acid characteristics, these silanol groups have a great affinity for hydroxyl or glycidyl groups of the comonomer or of the styrene copolymer, which creates chemical liaisons between the styrene-based matrix and the reinforcing mineral. Moreover, the acid pretreatment markedly increases the specific surface area of the phyllosilicate and facilitates separation of the mineral as discrete particles. Furthermore, contact between the matrix and the reinforcing mineral is maximized, which facilitates working of the composite material.

According to a preferred embodiment of the invention, the phyllosilicate (particularly asbestos fibers, and especially chrysotile) is incorporated in an admixture of styrene monomer and comonomer such as described above. The polymerization is achieved in any known way, either by heating or in the presence of a polymerization initiator.

While the polymerization of styrene monomer carried out in the presence of asbestos but without any particular comonomer gives low molecular weight polystyrene, it is surprisingly possible according to the process of the present invention by using low quantities of a comonomer to obtain styrene polymers having a very high styrene content and a high molecular weight, e.g. styrene contents of 83 – 99 molar percent, preferably 91 – 97 molar percent and molecular weight upward of 50,000, preferably 75,000–100,000, and especially 90,000–120,000. The comonomer is added to the styrene polymer in an amount of 1 – 17 and especially 3 – 9 molar percent based on styrene polyers.

While not wishing to be bound by any theory of the invention, it is probable that a non-negligible fraction of the comonomer is chemically adsorbed on the mineral, which allows the polymerization to proceed thereafter in a normal way. Indeed, after the reaction a large amount of the copolymer is bound to the phyllosilicate, even after subjecting the copolymer to a severe extraction with a solvent. It is possible that the existence of this chemical liaison between the copolymer and the reinforcing mineral can explain the very improved mechanical properties, particularly the high breaking strength of the composite materials prepared according to the present invention. The process of the invention also gives composites much clearer than those usually obtained by incorporating chrysotile fibers into a styrene polymer alone according to known methods.

According to the preferred embodiment of the invention in which phyllosilicate, styrene monomer and comonomer are reacted simultaneously, a phyllosilicate previously submitted to an acid treatment is used and an acrylate or a methacrylate as a comonomer. It is also possible to advantageously use an untreated phyllosilicate with a comonomer having an epoxy function, e.g., glycidyl acrylate or glycidyl methacrylate.

According to different embodiment, the process of the invention can advantageously be achieved in the following manner. A phyllosilicate, preferably first subjected to an acid treatment, is reacted with a comonomer in the presence of an organic solvent and a polymerization inhibitor at an elevated temperature, preferably at least 80°C. In order to facilitate esterification of the phyllosilicate by the comonomer, a fraction of the solvent is distilled off. After this reaction and drying, the esterified mineral is incorporated into monomeric styrene which is then polymerized according to known ways.

The preparation of the reinforced material according to the invention can also be carried out by incorporating a phyllosilicate, preferably one submitted to an acid treatment, into a copolymer according to the high temperature mixing methods which are well known in the art. In this case, and in the other above-mentioned cases, 5 to 40 parts by weight of reinforcing material are used for 100 parts by weight of copolymer, depending on the desired reinforcing effect.

The reinforced material of the present invention can also be obtained according to known methods of molding, by using a molding composition constituted by an admixture of a phyllosilicate, of a copolymer, in particular a copolymer of styrene and acrylic or methacrylic ester, and a compatible polymer, the latter being preferably constituted by standard styrene polymer or a mixture of styrene polymer and of at least another polymer. The phyllosilicate is preferably used in a proportion of 5 to 40 parts per 100 parts by weight of the organic polymer components.

The phyllosilicate, in particular asbestos preferably pretreated by an acid, can be mixed simultaneously with the copolymer and the styrene polymer and optionally with another polymer. The proportion of copolymer to be used is preferably comprised within the range from 2 to 30 parts per 100 parts by weight of polymers. It is also possible to achieve a preliminary coating of the phyllosilicate by the copolymer. The coating of the phyllosilicate is advantageously carried out by dipping the phyllosilicate (preferably submitted to an acid treatment) into a solution of copolymer in a solvent having a boiling point superior to 80°C and preferably superior to 120°C. A solvent fraction is then distilled in order to make easier the esterification of the phyllosilicate by the copolymer. The so-obtained coated mineral is incorporated into the polymer or into the admixture of polymers by mixing at high temperature. For example 5 to 30 parts by weight of phyllosilicate coated with a copolymer are used per 100 parts by weight of standard styrene polymer.

In the preparation of the materials according to the invention, polymers of the polyphenylene oxide type can be advantageously associated with styrene polymer. Materials exhibiting properties particularly interesting are obtained by using a mixture constituted by styrene polymer, such as impact styrene polymer, and polyphenylene oxide, in proportions comprised within the range from 20 to 80% by weight of styrene polymer per 80 to 20% by weight of polyphenylene oxide and preferably within the range from 40 to 60% by weight of styrene polymer per 60 to 40% by weight of polyphenylene oxide.

The composition containing the pre-cited mixture of polymers, the phyllosilicate and the copolymer is molded at a temperature which depends on the used polymers and on the relative proportions of the polymers. Generally this temperature is comprised within the range from 180° to 300°C.

The reinforced materials of the present invention are particularly useful in all of the fields of application known for impact polystyrene and can be formed in shaped objects, including granules, by conventional processing techniques.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following Examples, the temperatures are set forth uncorrected in degrees Celsius; unless otherwise indicated, all parts and percentages are by weight.

EXAMPLE 1

25 g. of chrysotile fibers (CASSIAR AK, obtained from Canadian mine), 100 g. of an admixture of 5 parts 2-hydroxyethyl methacrylate and 95 parts styrene monomer were introduced into a polymerization tube. 10% by weight of the magnesia octahedral layer of fibers had been previously eliminated by acid treatment. The system was degassed under vacuum, sealed and maintained in a constant temperature polymerization chamber at 120°C. for 7 days, then at 150°C. for 2 days.

After severe extraction of an aliquot with methylethylketone for 48 hours, 32% by weight of copolymer remained absorbed on the fibers. The remaining polymeric mass was homogenized on a roll-mill at 190°C., and the product was then molded in a press at 190°C. at a pressure equal to 70 kg/cm² for 5 minutes. The mechanical properties are given in the Table. By way of comparison, mechanical properties of commercial impact styrene polymers are given.

EXAMPLE 2

Esterification of CASSIAR AK fibers was effected in a 2000 ml reaction vessel under an inert atmosphere. 20% by weight of the magnesia octahedral layer of fibers were previously eliminated by acid treatment. The esterification reaction was carried out with 2-hydroxyethyl methacrylate in the presence of toluene as a solvent. 30 g. of the fibers were dispersed in 1600 ml of toluene and heated under reflux. Then, in order to dry fibers, 250 ml of toluene was distilled off. 150 ml of 2-hydroxyethyl methacrylate containing 0.5% by weight of benzoquinone as an inhibitor was then introduced into the reactor. The reaction medium was refluxed for 4 hours, during which time the solvent was slowly distilled in order to facilitate the esterification reaction. On completion of the reaction, the mixture was filtered and the fibrous product was dried in vacuum drier for at least 24 hours.

25 g. of this dried fibrous product and 100 g. of styrene monomer were introduced into a polymerization tube. The system was degassed under vacuum, sealed, and the polymerization was carried out under the same conditions as in Example 1. After working up in the same manner as Example 1, there was obtained a material in which 40% by weight of the copolymer remained absorbed on fibers. The mechanical properties of the composite material are given in the Table.

EXAMPLE 3

Example 1 was repeated except using an admixture of 98 parts styrene monomer and 2 parts 2-hydroxyethyl methacrylate. 5% by weight of the magnesia octahedral layer of fibers were previously eliminated by acid treatment. After extraction, there was obtained a composite material containing 18% by weight of copolymer absorbed on the fibers. The mechanical properties of the composite are given in the Table.

EXAMPLE 4

Example 1 was repeated but using 5 parts by weight of 2-hydroxypropyl methacrylate instead of 5 parts by weight of 2-hydroxyethyl methacrylate. The obtained composite material contained 21% by weight of copolymer absorbed on the fibers, the mechanical properties of which are set forth in the Table.

EXAMPLE 5

15 g. of pre-treated chrysotile fibers were incorporated at 190°C. into 60 g. of a statistically random copolymer containing 95 parts by weight styrene and 5 parts by weight 2-hydroxyethyl methacrylate by using a roll-mill. 10% by weight of the cationic octahedral layer of the fibers was previously eliminated by acid treatment. The molecular weight of the copolymer was: $\overline{M}_r = 100,000$ determined by using the constants of pure styrene polymer given by Flory in Principles of Polymer Chemistry (Cornell University Press, Ithaca, N.Y., 1953). Homogeneity of the composite was obtained in 20 minutes. The composite material was molded as in the preceding examples; its mechanical properties are given in the Table.

EXAMPLE 6

Example 5 was repeated but using a copolymer containing 5 parts by weight of 2-hydroxypropyl methacrylate instead of 5 parts by weight of 2-hydroxyethyl methacrylate. The molecular weight of copolymer was $\overline{M}_r = 90,000$ (determined as in Example 5). The mechanical properties of the composite material are given in the Table.

EXAMPLE 7

Example 5 was repeated but employing a copolymer containing 5 parts by weight of glycidyl methacrylate instead of 2-hydroxyethyl methacrylate. The copolymer had a molecular weight $\overline{M}_r = 115,000$. The mechanical properties of the obtained composite material are given in the Table.

EXAMPLE 8

In a 2000 ml reactor vessel provided with a helical stirrer and containing an inert gas, 75 g. of pre-treated chrysotile fibers and 75 g. of a copolymer dissolved in 2000 ml of xylene were introduced. 20% by weight of the cationic octahedral layer of the fibers had been previously eliminated by acid treatment. The copolymer contained 95 parts by weight of styrene and 5 parts of 2-hydroxyethyl methacrylate. The mixture was refluxed at 150°C. and stirred for a period of 4 hours with slow distillation of the solvent in order to facilitate the esterification reaction. The resultant coated fibers were washed with methylethylketone and dried under vacuum for at least 48 hours.

15 g. of the dried fibers were admixed with 60 g. of commercial styrene polymer (Alcofene S 100 provided by the French firm Pechiney-Saint-Gobain) using a calender at 190°C., and the product was molded as in the preceding examples. Its mechanical properties are given in the Table.

EXAMPLE 9

Example 1 was repeated but without first subjecting the chrysotile fibers to acid treatment. 25 g. of chrysotile fibers were employed and 100 g. of a solution containing 95 parts by weight of styrene monomer and 5 parts by weight of 2-hydroxyethyl methacrylate. After extraction, a product was obtained in which 32% by weight of copolymer was absorbed on chrysotile fibers. The mechanical properties are given in the Table.

EXAMPLE 10

Example 1 was repeated but using 100 g. of a solution of 99 parts by weight styrene monomer, and one part by weight glycidyl methacrylate, and using 25 g. of chrysotile fibers not previously treated by acid. The mechanical properties of the product are given in the Table.

EXAMPLE 11

Example 8 was repeated but employing 75 g. of a styrene and glycidyl methacrylate copolymer (relative proportions 95 : 5 parts by weight), in solution in 2000 ml of benzene. The mechanical properties of the product are given in the Table.

TABLE

Mechanical Properties of Composite Materials

|  | Flexural Modulus kg/cm² ASTM D 790 A | Resiliant Impact Strength kg.cm/cm² ASTM D 1822 | Tensile Strength kg/cm² ASTM D 638 | Traction Modulus kg/cm² ASTM D 638 |
|---|---|---|---|---|
| Conventional styrene polymer* | 35,000 | 4 | 300 | 35,000 |
| "Impact" styrene polymer** | 26,000 | 23 | 180 | 25,000 |
| Product of Example 1 | 62,000 | 29 | 470 | 54,000 |
| Product of Example 2 | 63,500 | 9.1 | 265 | 63,000 |
| Product of Example 3 | 72,500 | 19.5 | 390 | 66,000 |
| Product of Example 4 | 81,500 | 23 | 650 | 72,500 |
| Product of Example 5 | 65,000 | 22 | 290 | 64,000 |
| Product of Example 6 | 50,500 | 26.6 | 370 | 56,000 |

TABLE -Continued

| | Flexural Modulus kg/cm² ASTM D 790 A | Resiliant Impact Strength kg.cm/cm² ASTM D 1822 | Tensile Strength kg/cm² ASTM D 638 | Traction Modulus kg/cm² ASTM D 638 |
|---|---|---|---|---|
| Product of Example 7 | 58,000 | 19.4 | 320 | 58,000 |
| Product of Example 8 | 59,500 | 12.5 | 310 | 54,000 |
| Product of Example 9 | 48,000 | 15 | 310 | 45,500 |
| Product of Example 10 | 49,000 | 13.6 | 285 | 59,500 |
| Product of Example 11 | 54,000 | 19.4 | 304 | 60,500 |

Footnotes to Table:
* Afcolene S 100, provided by the French firm Pechiney-Saint-Gobain.
** Afcolene S 475, provided by the French firm Pechiney-Saint-Gobain.

EXAMPLE 12

25 g of acid-treated chrysotile fibers were incorporated at 190°C in 100 g of an admixture containing 95 parts by weight of commercial styrene polymer (Afcolene S 100 provided by the firm Pechiney Saint-Gobain) and 5 parts by weight of a copolymer constituted by 90% by weight of styrene and 10% by weight of 2-hydroxyethyl methacrylate. 10% by weight of the cationic octaedral layer of the fibers were previously eliminated by acid treatment. The incorporation was achieved by using a roll-miller, the homogeneity being completed in a period of 30 minutes. The composite material was molded. Its mechanical properties are given in the following table:

| | |
|---|---|
| Flexural modulus (kg/cm2) (ASTM D 790A) | 57 000 |
| Resilience impact strength (kg.cm/cm2) (DIN 53448) | 18 |
| Tensile strength (kg/cm2) (ASTM D 638) | 470 |
| Traction modulus (kg/cm2) (ASTM D 638) | 60 000 |

EXAMPLE 13

15 g of pre-treated chrysotile fibers were incorporated in 60 g of an admixture containing 95 parts by weight of Noryl general purpose (physical mixture of polyphenylene oxide and styrene polymer provided by the firm General Electric) and 5 parts by weight of a copolymer constituted by 90% by weight of styrene and 10% by weight of 2-hydroxyethyl methacrylate. 10% by weight of the cationic octaedral layer of the fibers were previously eliminated by acid treatment. The incorporation was achieved by using a Brabender Plastograph miller, at 225°C for a period of 20 minutes. The composite material was molded at 240°C. The following table gives the mechanical properties of the composite material and comparatively of unfilled Noryl.

| | Unfilled Noryl | Composite material |
|---|---|---|
| Flexural modulus (kg/cm²) (ASTM D 790A) | 22 000 | 44 000 |
| Resilience impact strength (kg/cm/cm²) (DIN 53 448) | 51 | 43 |
| Tensile strength (kg/cm²) (ASTM D 638) | 460 | 710 |
| Traction modulus (kg/cm²) (ASTM D 638) | 20 000 | 46 000 |

It can be seen from the above values that the polymer materials of this invention can be tailored to a variety of impact strengths greater than that of conventional polystyrene and even of presently available impact polystyrene, while exhibiting tensile strengths greater than impact polystyrene and in several instances greater than even conventional polystyrene. In all cases, the flexural modulus and traction modulus values are greatly improved over both comparative products.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a normally solid polymer composition comprising a vinyl aromatic polymer reinforced by a strengthening filler, the improvement wherein the strengthening filler comprises:
   a. 2–30 parts by weight per 100 parts by weight of vinyl aromatic polymer of a copolymer having a molecular weight $\overline{M}_r$ of at least 50,000 and consisting essentially of 100 molar parts of a vinyl aromatic monomer and 1–20 molar parts of an ethylenically unsaturated polar comonomer of the formula:

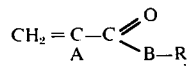

wherein A is hydrogen or alkyl of 1–6 carbon atoms, B is oxygen or —NH— and R is an organic hydrocarbon chain of 1–12 carbon atoms bearing a hydroxy or an epoxy group, said polar comonomer being directly absorbed or reacted onto the surface of
   b. 5–40 parts by weight, per 100 parts by weight of the total polymer content in the reinforced composition, of a particulate phyllosilicate capable of directly absorbing or reacting with said polar comonomer.

2. A composition according to claim 1, wherein said vinyl aromatic monomer is styrene.

3. A composition according to claim 2, wherein said comonomer is directly esterified with said phyllosilicate.

4. A composition according to claim 3, wherein said copolymer is directly grafted onto said phyllosilicate.

5. A composition according to claim 2, wherein said comonomer is one in which B is oxygen.

6. A composition according to claim 5, wherein said comonomer is one in which A is hydrogen or methyl.

7. A composition according to claim 5, wherein said comonomer is one in which R is 2-hydroxyethyl or 2-hydroxypropyl.

8. A composition according to claim 7, wherein A is hydrogen or methyl.

9. A composition according to claim 1, wherein said phyllosilicate is asbestos.

10. A composition according to claim 9, wherein said asbestos is chrysotile.

11. A composition according to claim 2, wherein said copolymer and said phyllosilicate are intimately blended with polystyrene.

12. A composition according to claim 2, wherein copolymer is directly grafted onto said polystyrene.

13. A composition according to claim 12, wherein said phyllosilicate is directly esterified with said comonomer.

14. A composition according to claim 12, wherein said phyllosilicate is intimately blended with said grafted polystyrene.

15. A composition according to claim 2 wherein said polystyrene is grafted onto said copolymer.

16. A composition according to claim 15, wherein said phyllosilicate is directly esterified with said comonomer.

17. A composition according to claim 15, wherein said phyllosilicate is intimately blended with said grafted copolymer.

18. A composition according to claim 2, wherein 5-30 wt. % of the metallic atoms in the octahedral layer of said phyllosilicate have been eliminated by acid treatment.

19. A composition according to claim 18, wherein said comonomer is one wherein R bears an epoxy function.

20. A composition according to claim 19, wherein said comonomer is glycidyl methacrylate.

21. A composition according to claim 18 wherein said comonomer is a hydroxyacrylate or a hydroxymethacrylate.

22. A particulate phyllosilicate coated with a copolymer having a molecular weight $\overline{M}_r$ of at least 50,000 and consisting essentially of 100 molar parts of a vinyl aromatic monomer and 1-20 molar parts of an ethylenically unsaturated polar comonomer of the formula

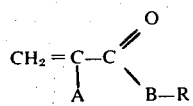

wherein A is hydrogen or alkyl of 1-6 carbon atoms, B is oxygen or —NH— and R is an organic hydrocarbon chain of 1-12 carbon atoms bearing a hydroxy or an epoxy group, characterized by said polar comonomer, either as such or as a copolymer component, being reacted or absorbed directly onto said phyllosilicate so that at least 18 wt. % of the copolymer is bound to the phyllosilicate even after severe solvent extraction.

23. A phyllosilicate according to claim 22 wherein 5-30 wt. % of metallic atoms in the octahedral layer of said phyllosilicate have been eliminated by acid treatment.

24. A phyllosilicate according to claim 23, wherein said vinyl aromatic monomer is styrene.

25. A phyllosilicate according to claim 24, wherein said phyllosilicate is asbestos.

26. A phyllosilicate according to claim 25, wherein said asbestos is chrysotile.

27. A process for preparing a phyllosilicate according to claim 24, which comprises polymerizing 1-20 parts by weight of said comonomer with correspondingly 99-80 parts by weight of styrene in the presence of directly unto the surface of said phyllosilicate.

28. A process for preparing a phyllosilicate according to claim 24, which comprises directly esterifying said acid treated phyllosilicate with said comonomer followed by graft polymerizing styrene onto the resultant esterified phyllosilicate.

29. A process for preparing a phyllosilicate according to claim 24, which comprises directly esterifying said phyllosilicate with said copolymer.

30. A process for preparing a composition according to claim 1, which comprises homogeneously incorporating a phyllosilicate coated with said copolymer into said styrene polymer at a high temperature.

31. A process for preparing a composition according to claim 1 characterized in that the monomer and the comonomer are copolymerized and 5-40 parts by weight of the phyllosilicate are incorporated into 100 parts by weight of a mixture consisting essentially of the resultant copolymer, a styrene polymer and optionally another polymer.

32. A process according to claim 31, wherein said optional polymer is present as a polyphenylene oxide.

33. A composition according to claim 1 in the form of a shaped object.

34. A composition according to claim 2, wherein said normally solid polymer composition comprises an admixture of 20-80% by weight polystyrene with correspondingly 80-20% by weight of a polyphenylene oxide.

35. A composition according to claim 34, containing 40-60% by weight polystyrene in the admixture.

36. A phyllosilicate according to claim 22 wherein the copolymer is grafted onto a phyllosilicate directly esterified with said ethylenically unsaturated polar comonomer.

37. A phyllosilicate according to claim 36, wherein said vinyl aromatic monomer is styrene.

38. A phyllosilicate according to claim 37, wherein said phyllosilicate is asbestos.

39. A phyllosilicate according to claim 38, wherein said asbestos is chrysotile.

* * * * *

UNITED STATES PATENT OFFICE
CERTIFICATE OF CORRECTION

PATENT NO. : 3,897,385
DATED : July 29, 1975
INVENTOR(S) : Michel Van Russelt, et al It is certified that error appears in the above-identified patent and that said Letters Patent are hereby corrected as shown below:

Claim 12  Column 11, line 4:  Insert --said-- after "wherein".

Claim 12  Column 11, line 5:  Delete "said".

Claim 27  Column 12, line 12:  "unto" should be --onto--.

Claim 30  Column 12, line 23:  "a" should be --said--.

Signed and Sealed this twenty-seventh Day of January 1976

[SEAL]

Attest:

RUTH C. MASON
Attesting Officer

C. MARSHALL DANN
Commissioner of Patents and Trademarks

UNITED STATES PATENT AND TRADEMARK OFFICE
CERTIFICATE OF CORRECTION

PATENT NO. : 3,897,385
DATED : July 29, 1975
INVENTOR(S) : Michel Van Russelt, et al It is certified that error appears in the above-identified patent and that said Letters Patent are hereby corrected as shown below:

Claim 27  Column 12, line 11:  Delete "in the presence of".

Claim 27  Column 12, line 12:  Change "unto" to --onto--.

Signed and Sealed this sixteenth Day of March 1976

[SEAL]

Attest:

RUTH C. MASON
*Attesting Officer*

C. MARSHALL DANN
*Commissioner of Patents and Trademarks*